United States Patent [19]

Blass

[11] 4,047,588
[45] Sept. 13, 1977

[54] SNOWMOBILE ENGINE MOUNT

[75] Inventor: Jaroslav Blass, Chaska, Minn.

[73] Assignee: Kawasaki Motors Corporation U.S.A., Santa Ana, Calif.

[21] Appl. No.: 643,554

[22] Filed: Dec. 22, 1975

[51] Int. Cl.² ............................................. B60K 5/06
[52] U.S. Cl. .................. 180/64 R; 180/5 R; 248/8
[58] Field of Search ............... 180/64 R, 5 R; 248/8, 248/9, 10

[56] References Cited

U.S. PATENT DOCUMENTS

| 1,732,012 | 8/1929 | Caminez | 248/9 |
|---|---|---|---|
| 2,044,713 | 6/1936 | Trott | 180/64 R |
| 2,044,714 | 6/1936 | Trott | 180/64 R |
| 2,377,006 | 5/1945 | Heinemann et al. | 180/64 R |
| 2,715,510 | 8/1955 | Fillion | 248/10 |
| 3,154,704 | 10/1964 | Shaffer | 248/10 |
| 3,326,501 | 6/1967 | Cauvin | 180/64 R |
| 3,776,354 | 12/1973 | Duclo et al. | 180/64 R |
| 3,871,460 | 3/1975 | Dehnert | 180/5 R |

Primary Examiner—Joseph F. Peters, Jr.
Assistant Examiner—David M. Mitchell

[57] ABSTRACT

An improved engine mount for a snowmobile has mounting means for securing the output end of the engine to a substantially vertical side frame. The mounting means comprises rigid inner and outer mounting members spaced radially of, and surrounding, the output shaft of the engine and a resilient intermediate member trapped between the inner and outer mounting members.

2 Claims, 5 Drawing Figures

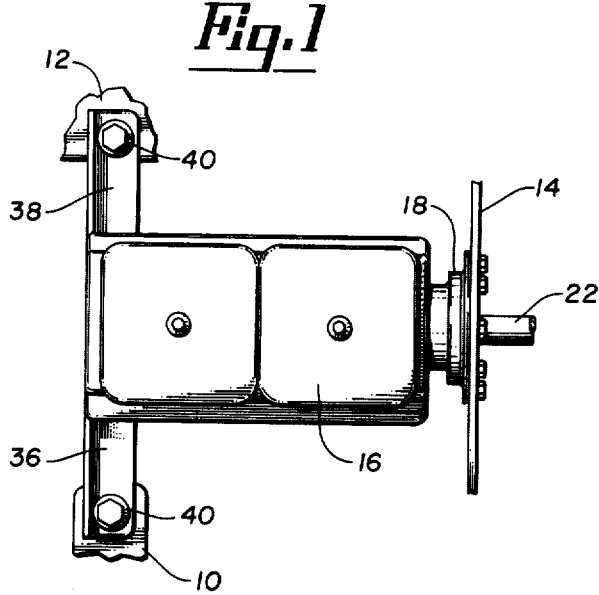
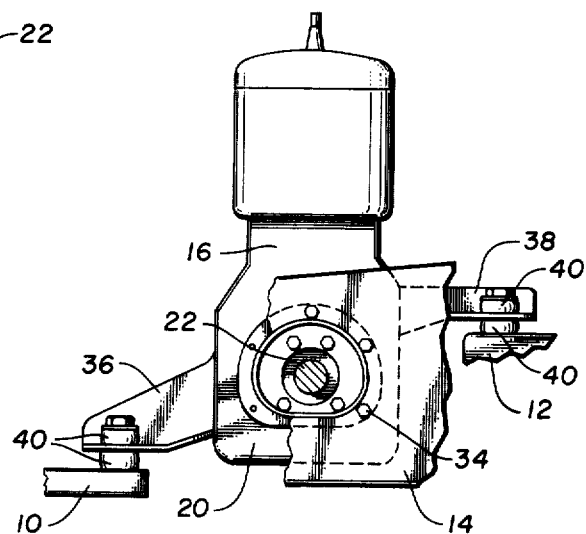
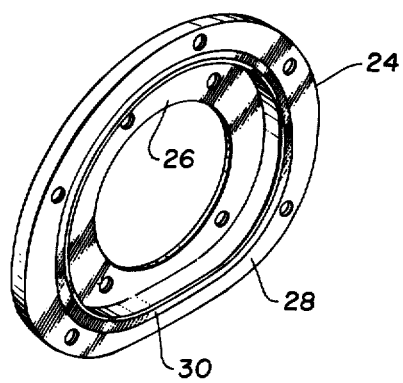
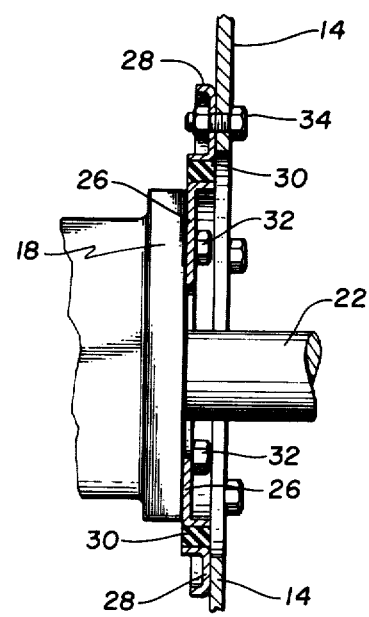
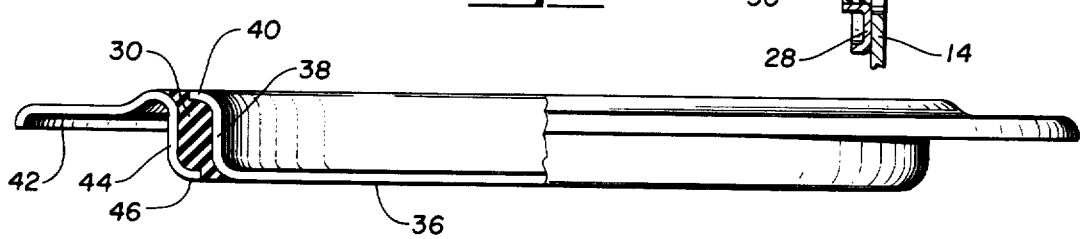

SNOWMOBILE ENGINE MOUNT

BACKGROUND OF THE INVENTION

The invention relates to an engine mounting particularly for use in a snowmobile.

Various means have been employed in snowmobiles to isolate engine vibrations from the chassis. Heretofore, however, none have employed a resilient engine mounting between the crankcase and the sidewall of the chassis.

SUMMARY OF THE INVENTION

The present invention isolates engine vibrations from the chassis by the provision of an engine mount between the crankcase of the engine and the side frame of the chassis. The mount comprises an inner rigid mounting member which is secured to a flange extending from the crankcase on the output end of the engine, a rigid outer mounting member which is secured to the side frame of the chassis, and a resilient intermediate member trapped between the inner and outer mounting member. The resilient intermediate member preferably completely surrounds the output shaft but is spaced therefrom. The opposite end of the engine may employ mounting means located forwardly and rearwardly of the engine so that a line drawn between the mounting means will intersect the axis of the output shaft. In the alternative, mounting means identical or similar to that employed on the output shaft end of the engine may be employed on the opposite end thereof.

BRIEF DESCRIPTION OF THE DRAWINGS

FIG. 1 is a top plan view of an engine mounted in accordance with the invention.

FIG. 2 is a side elevational view thereof.

FIG. 3 is a perspective view of the side-frame mounting device.

FIG. 4 is a cutaway elevational view of the side-frame engine mount with a cross-section through the mount.

FIG. 5 is a cross-sectional view of an alternate embodiment of a side-frame mounting means.

DESCRIPTION OF THE PREFERRED EMBODIMENTS

In FIGS. 1, 2, and 4, forward and rearward portions of snowmobile chassis supports are indicated by the numerals 10 and 12. A portion of the generally vertical side frame of a conventional snowmobile is indicated by the numeral 14. An engine 16 is shown (schematically) mounted in place between the side frame 14 and the chassis supports 10 and 12. A crankcase extension flange 18 extends laterally outwardly from the crankcase 20 of the engine 16. These figures also show a rotatable output shaft 22 extending from the engine 16 outwardly of the side frame 14 in a well-known manner. Typically, an expansible drive clutch (not shown) is rigidly mounted to the output shaft 22 for rotation therewith.

FIG. 3 shows side frame mounting means generally designated by the numeral 24. The mounting means 24 comprises a rigid inner mounting member 26, a rigid outer mounting member 28, and a resilient intermediate member 30 trapped between the inner and outer mounting members. Preferably all three mounting members completely surround the output shaft to provide structural rigidity and also to provide vibration isolation 360° radially of the axis of the shaft. The inner and outer members 26 and 28 are secured to the flange 18 and the side frame 14 by means of a plurality of nuts and bolts 32 and 34, respectively.

The inner resilient member 30 can be formed from any suitable material, such as rubber, and may be bonded to the inner and outer members 26 and 28 as best shown in FIGS. 3 and 4. However, for additional torsional rigidity, the side frame mounting means 24 may also be provided with a mechanical interlock as shown in the alternate embodiment in FIG. 5.

In the alternate embodiment, the inner mounting member 26 comprises a base portion 36 suitably adapted to be secured to the flange 18, a first wall portion extending outwardly from the base portion 36 in a direction generally parallel to the axis of the output shaft 22, and a second wall portion 40 extending from the first wall portion 38 in a direction generally normal thereto.

Likewise, the outer mounting member 28 comprises a base portion 42 suitably adapted to be secured to the side frame 14, a first wall portion 44 extending from the base portion toward the engine 16, and a second wall portion 46 extending from the first wall portion 44 in a direction generally normal thereto.

It should be apparent that the wall portions 38, 40, 44, and 46 of the inner and outer mounting members 26 ansd 28 restrain movement of the resilient intermediate member 30 in all directions. It follows, then, that the particular configuration of these walls described is merely an example. Obviously, other shapes could be used to accomodate different shapes of the resilient member 30 as long as movement thereof is restrained without having direct contact between the inner and outer mounting members 26 and 28. Obviously, the resilient member 30 could also be bonded to the inner and outer mounting members if desired.

Forwardly and rearwardly extending brackets 36 and 38, respectively, are secured to the engine 16 at or near the opposite end thereof. The brackets 36 and 38 are each trapped between a pair of rubber bushings 40, and the brackets and bushings are bolted to the chassis supports 10 and 12. The rubber bushings serve to isolate engine vibrations from the chassis supports 10 and 12. Preferably the connecting means between the brackets 36 and 38 and the chassis supports 10 and 12 are located so that an imaginary line drawn through the connecting means will intersect the axis of the output shaft 22.

While not shown in the drawings, it should be apparent that a mounting means 24 could also be employed at the end of the engine opposite the output shaft, either with or without the forward and rearward mounting means, depending on the size and horsepower of the engine.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. In a snowmobile having a chassis including a generally vertical side frame, and an engine including an output shaft extending laterally therefrom through said side frame and an output end having a crankcase extension flange extending outwardly therefrom, an improved engine mounting comprising;

first mounting means at the output end of said engine including rigid inner and outer mounting members spaced radially of said output shaft and a resilient intermedite member trapped between said rigid inner and outer members; said inner mounting member comprising a base portion secured to said extension flange, a first wall portion extending outwardly from said base portion in a direction generally parallel to the axis of said output shaft and a second wall portion extending from the first wall portion normal thereto; said outer mounting member comprising a base portion secured to said side frame, a first wall portion extending from said base portion toward said engine and a second wall portion extending from said first wall portion normal thereto, said first and second wall portions of said inner and outer members restraining movement of said intermediate member in all directions, said inner, outer and intermedite mounting members being formed to completely surround said output shaft;

and second mounting means securing the opposite end of said engine to said chassis; said second mounting means comprising brackets extending forwardly and rearwardly from said engine, the outer ends of each of said brackets being trapped between rubber bushings.

2. The improvement in accordance with claim 1 wherein a line drawn between said points of securement of said brackets to said chassis passes through said output shaft.

* * * * *